June 14, 1960 D. H. KAYS 2,940,622
LATCH MECHANISM FOR END PANELS FOR WAGONS
Filed Dec. 19, 1958
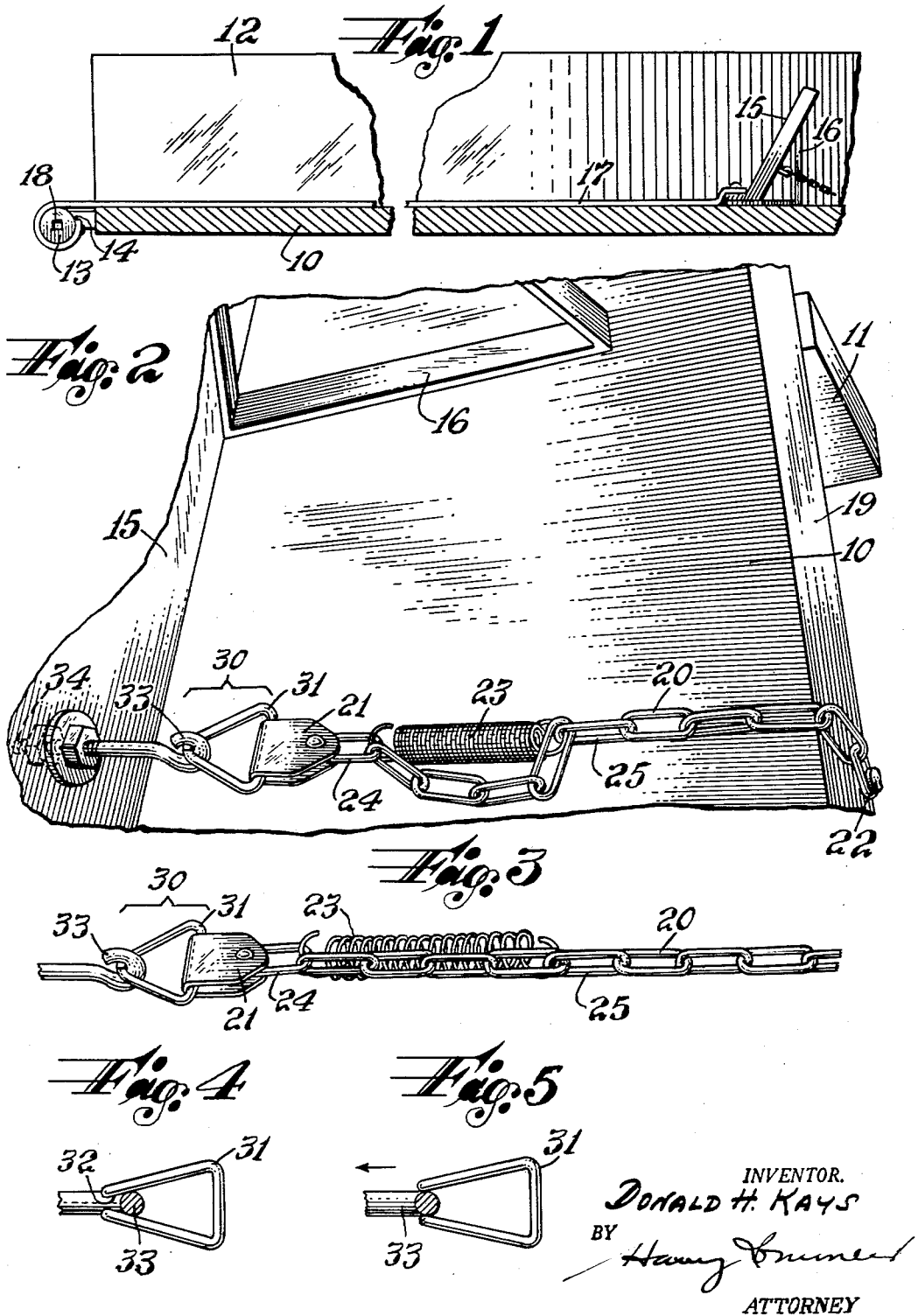
INVENTOR.
DONALD H. KAYS
BY Harry Immeur
ATTORNEY

2,940,622
LATCH MECHANISM FOR END PANELS FOR WAGONS

Donald H. Kays, Hope, N.J.

Filed Dec. 19, 1958, Ser. No. 781,640

2 Claims. (Cl. 214—82)

This invention relates to a wagon construction for farm products initially deposited on the floor of the wagon between the side walls and an end wall panel, the invention providing novel means for initially positioning said end panel at one end of the wagon latched and under tension and in latched position and for disengaging the latching means automatically and moving the panel, after filling the wagon, to the opposite end thereof, to discharge the contents of the wagon.

Pursuant to the invention, the latch mechanism automatically disengages the end panel from the end of the wagon so that said panel may be moved progressively (with the contents of the wagon) to the opposite ends of the wagon for the discharge operation. The invention obviates the danger of imposing excessive strains on the end panel and of damaging parts of the wagon when the end panel is rigidly secured to the wagon. The invention further provides for limited movement of the end panel under tension, while latched, to accommodate its movement, for example, when bumps are encountered, to the normal movement of the wagon.

Examples of practical devices embodying the invention are described below and in the accompanying drawings; the invention is not limited thereto, but covers all other forms coming within the scope or purview of the disclosure herein.

In the drawings:

Fig. 1 is a fragmentary, longitudinal sectional view of a wagon provided with a latch mechanism of this invention, Fig. 2 is a fragmentary, perspective view of the end of said wagon provided with said latch mechanism, Fig. 3 is a fragmentary view of said mechanism, with the spring thereof shown expanded for limited movement of the end panel, Fig. 4 is a fragmentary, top plan view of a separable member which may form the latch mechanism, shown in latching position, and Fig. 5 shows the parts about to be separated responsive to excessive tension exerted thereon.

As shown in the drawings, the device of the invention is used in connection with a typical farm wagon having a floor 10 which may be provided with a suitable understructure 11 (Fig. 2) to which two sets of wheels (not shown) are secured, one set fixed and one movable, the wagon having side walls 12 along the longitudinal edges of said floor, defining therewith a body into which farm products may be deposited. A roller 13 is journalled as at 14 at the discharge end of said wagon and an end closure panel 15 is movably positioned on the wagon floor as by providing said end closure panel 15 with brackets 16 which enable said end closure panel 15 to be slidably positioned on the wagon floor 10. A cable (or pair of cables) 17 is secured at opposite ends to the panel and to the roller 13. On coupling the roller 13 to a driving mechanism (for which purpose the roller 13 may have a keyway or other coupling means 18) and rotating the roller counter-clockwise (viewing the parts as shown in Fig. 1) as the cable 17 comes wound around the roller, the end closure panel 15 and thereby the contents of the wagon are moved toward the discharge (roller) end of the wagon.

In use of the wagon the end panel 15 is initially moved to the end 19 (Fig. 2) of the wagon floor 10 remote from the roller 13, so that the full length of the wagon may be available for filling. End panel 15 is latched to the end 19 (Fig. 2) of the wagon, a length of chain 20 secured to a bracket 21 fixed to said panel 15, the opposite end of the chain being secured to a lug 22 or other holder on the end 19 of the wagon. In the normal use of the invention, the end panel 15 is moved to its position adjacent end 19 of the wagon, and chain 20 engaged to lug 22, sufficient tension being exerted by the cables 17 on the end panel 15 in one direction and the chain 20 in the other direction (Fig. 1) to hold the end panel adjacent the end 19 of the wagon while the wagon is being filled. In order to adjust the position of the end panel to limited movements thereof without stress or strain responsive to bumping of the wagon in use, a spring 23 may be provided engaged at opposite ends to two of the links (24, 25) of the chain. Normally said spring contracts (Fig. 2) to connect said links 24—25 with intermediate links loosely disposed out of line. When the end panel 15 is urged forwardly (toward the roller 13 end of the wagon) on bumping of the wagon or for any other reason, the spring expands responsive to movement of the links 24, 25 apart (Fig. 3) and the links intermediate said links 24—25 move to a straight line, directly connecting links 24, 25 and thereby the end closure panel 15 to the wagon end 19. Expansion and contraction of spring 23 will enable a limited range of movement of the end panel without breaking its positive connection with the end 19.

When the wagon has been filled and it is desired to empty it, the roller 13 is rotated, drawing the end panel 15 toward the roller end of the wagon. In so doing, pursuant to the invention, the end panel 15 will be automatically disengaged from the end 19 of the wagon, without stress and strain and damage which would otherwise be imposed. Also, the operator of the wagon is relieved of the necessity of disengaging the end panel and loss of time and risk entailed in performing the operation or in forgetting to do so.

Thus, pursuant to the invention, the parts are coupled together with the end panel in position under tension at all times, allowing for the relative slight movement of the parts responsive to jogging forces encountered in use, and means are provided for automatically releasing the end panel at the proper time upon winding the cable 17 on the roller 13. For that purpose latch means 30 (Fig. 3) are provided intermediate the chain 20 and the panel 15 and connecting said chain to said panel, said latch means being separable on exertion of tension above the limited amount above mentioned. The latch means preferably comprise a split ring 31 which may be in the form of a triangle or other form having a sharply defined angle and being slit at said angle (32, Fig. 4) the ring being pre-tensioned to normally tend to close the slit therein. A member 33 encircles the ring and is connected as at 34 (Fig. 2) to the end panel 15; the bracket 21 connects the chain to the ring 31 and both to end panel 15 as at 34 (Fig. 2). When it is desired to empty the wagon, the cable 17 is entrained over roller 13 by suitable means (not shown); the end panel 15, drawn toward the roller end of the wagon, exerts excess stress on the slit portion 32 of the ring 31, causing said ring to open (Fig. 5), and the member 33 to be drawn through the slit portion 32 (Fig. 5), cable 17 then drawing the end panel toward the roller end of the wagon and thereby emptying the wagon with the end panel thus disengaged from the end 19 of the wagon.

When it is desired to restore the end panel in position (Fig. 2) adjacent the end 19 of the wagon for reloading, that may be done by simply re-inserting ring 31 in the member 33 (Figs. 2 and 4).

Having thus described my invention, what I claim as new and desire to secure by Letters Patent is:

1. A latching mechanism for use in a wagon having a floor and side walls along the longitudinal edges of said floor defining therewith a body into which farm products may be deposited and a roller journaled at one end of said roller, an end closure panel, a cable secured at opposite ends to said roller and to said panel so that, on rotating the roller, the end panel will be drawn toward the roller end of the wagon, thereby moving products positioned in the wagon toward that end of the wagon, said latching mechanism comprising means engaging the panel and the end of the floor remote from said roller end thereof to latch the panel to the last mentioned end against the tension of said cables, said latch means being separable on the exertion of tension above that normally exerted on the end panel by the cable urging the end panel forwardly against the holding action of said latch means, so that when tension above such normal tension is so exerted on the end panel, upon winding said cable on said roller for unloading the wagon, the latch means will separate, disconnecting the end panel from the end of the wagon remote from the roller end, whereupon the end panel and products in the wagon may be progressively moved toward the roller end of the wagon for unloading the wagon, said separable latch means including a plurality of connected links, and a spring engaged at opposite ends to two of said links, said spring contracting to connect said two links in straight line with the links intermediate said two links loosely disposed out of line and expanding when said two links are moved apart so that the links intermediate said two links will move in a straight line and directly connect said two links.

2. In a latching mechanism for use in a wagon as set forth in claim 1, said separable latch means further including a ring and a holding member connected together intermediate and secured to the links and the end panel, said ring having a sharply defined angle marking one end thereof and being split at said sharply defined angle and tensioned to normally close the slit portion thereof, and said holding member having a loop portion for encircling said ring and an open portion for inserting said ring therein.

References Cited in the file of this patent

UNITED STATES PATENTS

| | | |
|---|---|---|
| 1,752,619 | Summerfield | Apr. 1, 1930 |
| 2,301,641 | Pendleton | Nov. 10, 1942 |
| 2,640,613 | Kuhl | June 2, 1953 |